INVENTOR
JOHANNES L. VAN DEN KIEBOOM
BY Olsen and Stephenson
ATTORNEYS

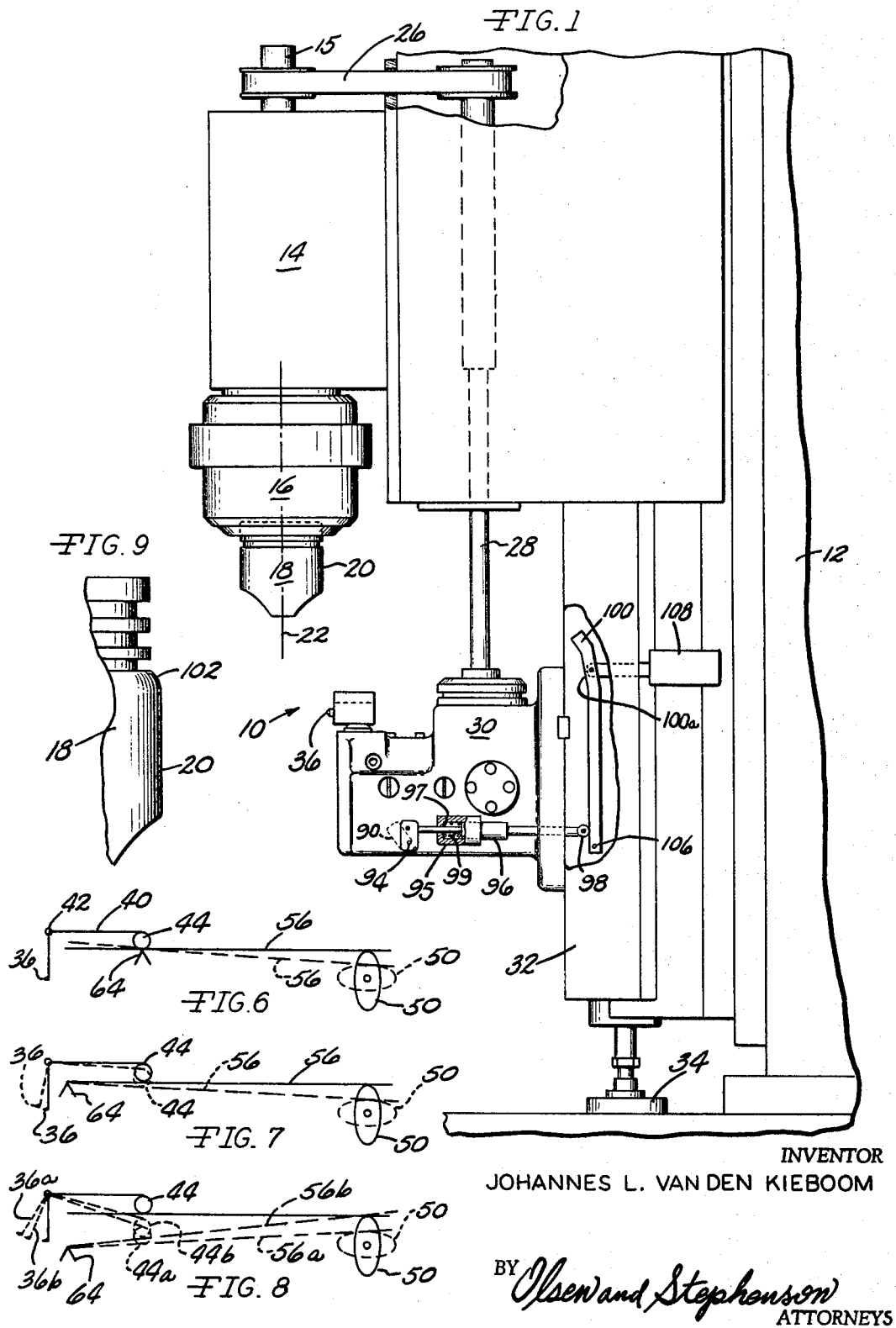

INVENTOR
JOHANNES L. VAN DEN KIEBOOM

BY Olsen and Stephenson
ATTORNEYS

United States Patent Office 3,391,587
Patented July 9, 1968

3,391,587
APPARATUS FOR MACHINING ARTICLES SUCH AS PISTONS FOR INTERNAL COMBUSTION ENGINES
Johannes L. Van Den Kieboom, Mt. Clemens, Mich., assignor to La Salle Machine Tool, Inc., Warren, Mich., a corporation of Michigan
Filed May 31, 1966, Ser. No. 554,190
9 Claims. (Cl. 82—19)

This invention relates generally to apparatus for machining workpieces to a desired shape, and more particularly to improve apparatus capable of turning articles which can be rotated about an axis to a predetermined and variable cross-section shape.

The apparatus of this invention is particularly suited to the rapid turning of pistons for internal combustion engines to a predetermined shape. The necessary shape for internal combustion engine pistons is becoming increasingly complex and variable from one engine to the next. These necessary complex shapes for pistons is due to the fact that the metal in the piston skirts is non-uniformly distributed about the periphery of the skirt, for example because of the wrist pin holes in the skirt, and, therefore, during use of the engine when the pistons become hot they expand non-uniformly. Consequently, a more or less elliptical cross-sectional shape has been required in pistons for some time, and the exact size of the elliptical cross section must vary along the length of the piston skirt. Thus, pistons are often described as being provided with a taper. However, it is also sometimes desirable to provide a non-uniform taper lengthwise of the piston skirt, and the exact shape of this taper may vary from the pistons for one engine to the next for a different engine. Consequently, while apparatus for machining a piston to an elliptical cross section with a longitudinal taper has heretofore been known, as illustrated by U.S. Patent No. 2,720,806, apparatus capable of machining a greater variety of configurations in piston skirts is desirable. It is an object of this invention, therefore, to provide improved machining apparatus of the foregoing character which is readily adjusted to machine a workpiece of the desired cross section and of the desired lengthwise taper.

Another object of this invention is to provide machining apparatus of the foregoing character in which a workpiece is rotated about its axis, a turning tool is moved in a direction parallel to the axis, and structure is provided for moving the turning tool toward and away from the axis so as to provide the workpiece with an elliptical cross-sectional configuration that is variable along the axis and to also taper the workpiece along its major diameter.

Further objects, features and advantages of this invention will become apparent from a consideration of the following description, the appended claims, and the accompanying drawing in which:

FIGURE 1 is a fragmentary elevational view of the machining apparatus of this invention, with some parts broken away for the purpose of clarity;

Figure 3:
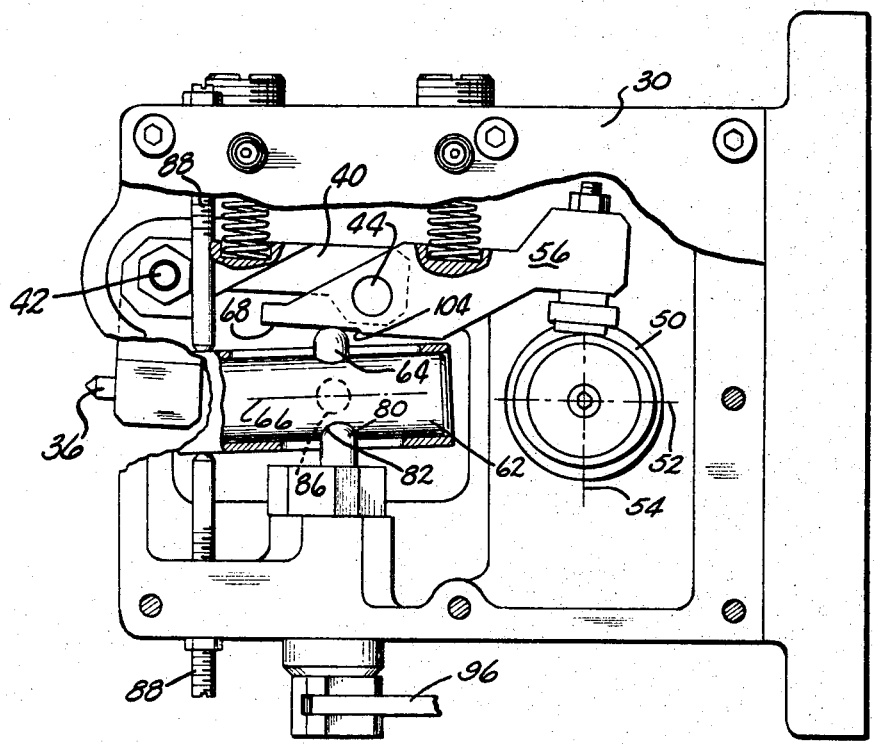
FIGURE 3 is an enlarged fragmentary bottom view like FIG. 2 showing a different adjusted position of the apparatus of this invention.

FIGURES 6-8, inclusive, are diagrammatic views illustrating the operation of the apparatus of this invention; and FIGURE 9 is a fragmentary view of a piston illustrating one shape of the piston skirt machined in the apparatus of this invention.

With reference to the drawing, the apparatus of this invention, indicated generally at 10, is illustrated in FIG. 1 as including a main frame 12 on which a drive motor 14 is mounted. The motor 14 has a drive shaft 15 which drives a clamping head 16 capable of clamping a piston 18 in the position illustrated in FIG. 1 in which the piston skirt 20 extends downwardly, and the piston 18 is rotated about its axis 22. The shaft 15 also drives a belt 26 which drives a substantially parallel telescoping shaft 28 which extends downwardly below the piston 18.

The shaft 28 extends into a housing 30 which is secured to a slide bar 32 that is in turn guidably mounted on the main frame 12 for up and down movement substantially parallel to the piston axis 22. A piston and cylinder assembly 34, of conventional type, is mounted on the main frame 12 and secured to the slide bar 32 for moving the slide bar 32 up and down.

Figure 2:
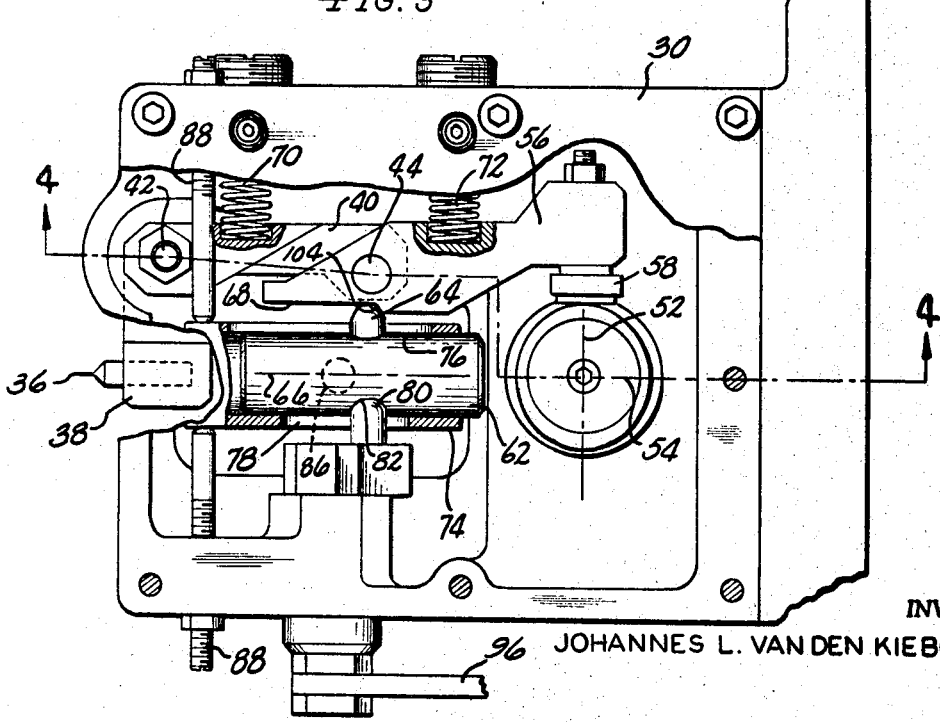
FIGURE 2 is a bottom enlarged view of a portion of the apparatus shown in FIG. 1, with some parts broken away and other parts shown in section for the purpose of clarity, illustrating one adjusted position of the apparatus of this invention.
Figure 4:
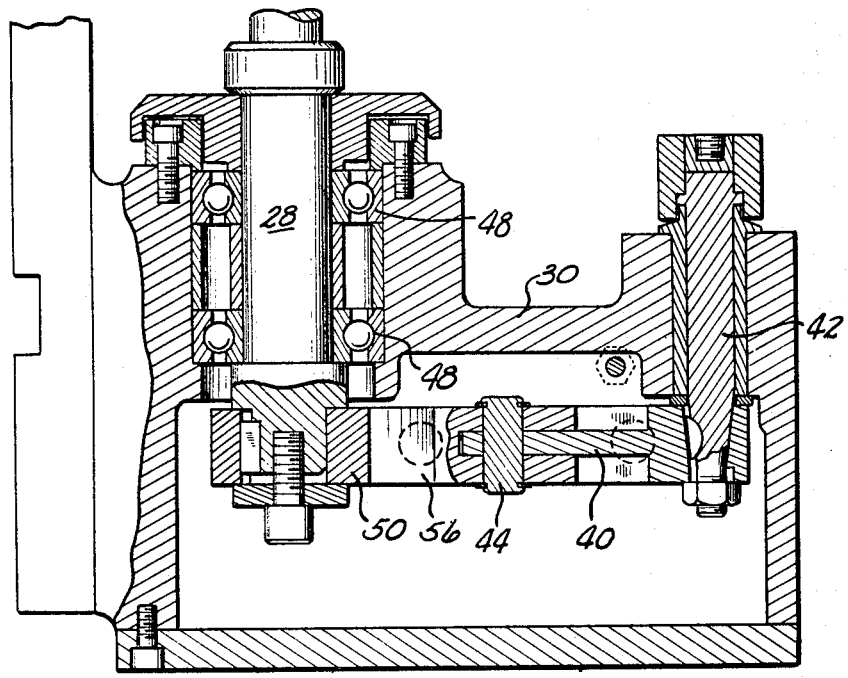
FIGURE 4 is a sectional view of a portion of the apparatus of this invention as seen from substantially the line 4—4 in FIG. 2.

A turning tool 36 (FIGS. 1, 2 and 4) is mounted on one end 38 of a bell crank 40 which is mounted intermediate its ends on a pivot 42 carried by the housing 30. A pin 44 extends through the opposite end 46 of the bell crank 40. The shaft 28 extends into the housing 30 where it is supported on bearings 48 (FIG. 4) and is provided on its inner end with a cam 50 which is substantially elliptical in shape having a major axis 52 and a minor axis 54 (FIG. 2). A lever 56 carries a follower 58 at one end which is engaged with the cam 50, and intermediate its ends the lever 58 is mounted on the pin 44 which thus connects the bell crank 40 and the lever 56.

A slide pin 62 in the housing 30 is provided with a projection 64 which extends transversely of the pin axis 66. The projection 64 constitutes a fulcrum for the lever 56 and is positioned in engagement with a straight surface portion 68 of the lever 56 as shown in FIGS. 2 and 3. Compression springs 70 and 72, carried by the housing 30, engage the bell crank 40 and the lever 56, respectively, so as to urge these members toward the fulcrum 64 and maintain the lever portion 68 in engagement with fulcrum 64. It can thus be seen that during rotation of the cam 50, the spring 72 will maintain the follower 58 in engagement with the cam 50 and will provide for pivoting of the lever 56 about the fulcrum 64 as the follower 58 moves in and out on the cam surface.

Figure 5:
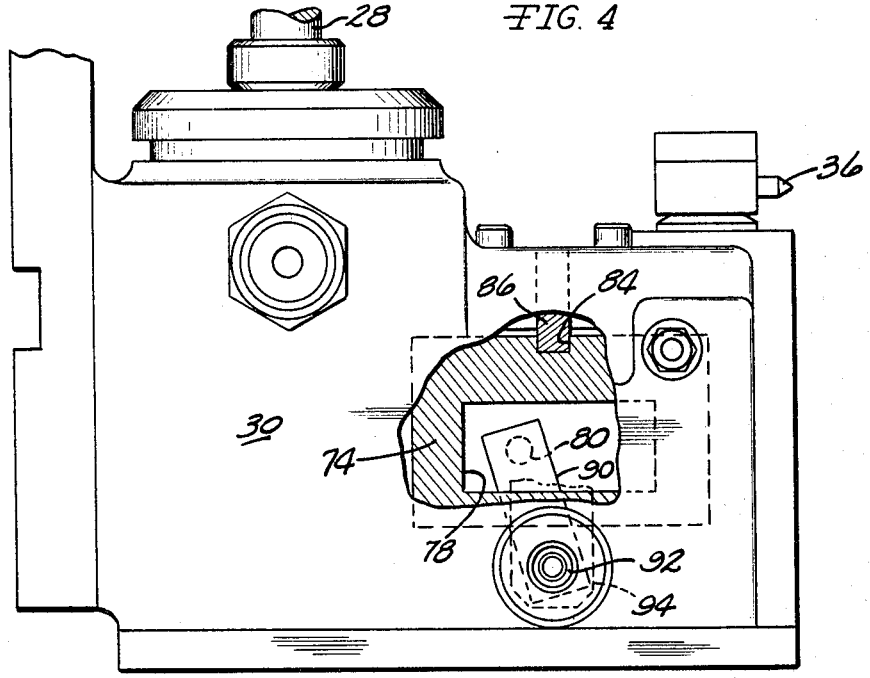
FIGURE 5 is a side elevational view of the portion of the apparatus of this invention shown in FIGS. 2-4, with some parts broken away and other parts shown in section for the purpose of clarity.

The slide pin 62 is mounted for axial sliding movement in a body 74 mounted in the housing 30. The body 74 is generally rectangular is shape and is provided on one side with a slot 76 through which the fulcrum 64 extends. A slot 78 in the opposite side of the housing 74 is provided so that an actuating pin 80 can extend through the slot 78 into a cavity 82 in the slide pin 62. A third side of the body 74 is provided with a cavity 84 (FIG. 5) in which a dowel pin 86 carried by the housing 30 is positioned. The body 74 is thus pivotally movable about the dowel pin 86 to thereby adjust the position of the axis 66 of the slide pin 62. A pair of set screws 88 extend through the housing 30 and engage opposite sides of the body 74 for pivoting the body 74 about the dowel pin 86 and maintaining the body 74 in an adjusted position. It can thus be seen that the set screws 88 can be adjusted to position the body 74 so that the slide pin axis 66 is parallel to the lever surface 68, as shown in FIG. 2, or position the body 74 so that the slide pin axis 66 is inclined with respect to the lever surface 68 as illustrated in FIG. 3. The importance and significance of this adjustment is explained hereinafter.

The actuating pin 80 which is operable to move the slide pin 62 along its axis 66 is mounted on one end of an actuating arm 90 (FIG. 5), the opposite end of which is fixedly secured to a pivot 92 rotatably supported on the housing 30. One end of a second arm 94 is also fixedly secured to the pivot 92, the opposite end of the arm 94 being mounted on a link 96. As shown in FIG. 1, the link 96 carries a cam follower 98 which engages a cam 100 mounted on the main frame 12. The link 96 extends through a boss 95 on housing 30, and a compression spring 97 extends between the boss 95 and a shoulder 99 on the link 96 so as to maintain the follower 98 in engagement with the cam 100. As a result, during movement of the housing 30 on the main frame 12, in response to actuation of the cylinder assembly 34, so as to move the housing in a direction parallel to the piston axis 22, the follower 98 is moved along the cam 100 to in turn pivot the arm 90 so as to move the slide pin 62 axially, thereby moving the fulcrum 64 relative to the lever surface 68.

The operation of the apparatus 10 is best understood by reference to the diagrammatic illustrations in FIGS. 6, 7 and 8. Assume first that the set screws 88 have been adjusted so that the body 74 is in the position illustrated in FIG. 2 in which the slide pin axis 66 is parallel to the lever portion surface 68. Assume also that the fulcrum 64 is at the right-hand end of the surface 68 (sometimes referred to herein as the beginning position of the fulcrum 64), as illustrated in FIG. 2, and that the tool 36 is at the lower end of the piston skirt 20. This condition is illustrated diagrammatically in FIG. 6 in which the size of the major axis 52 of the cam 50 relative to the minor axis 54 is exaggerated for illustrative purposes. The fulcrum 64 is aligned with the pin 44, so that as the cam 50 rotates the lever 56 is moved between its solid line position in which it follows the major cam axis 52 and its broken line position in which it follows the cam minor axis 54. Because the fulcrum 64 is aligned with the pin 44, it can be seen that the pin 44 remains in a fixed position during rotation of the cam 50. Consequently, the bell crank 40 remains stationary so that the tool 36 is not moved toward or away from the piston axis 22. As a result, during rotation of the piston 18 about its axis 22, with the tool 36 in engagement with the skirt 20, the piston 18 will be machined to a circular cross section.

As the cam follower 98 moves onto a portion 100a of the cam 100, the lever 90 is rotated to move the slide pin 62 axially to the left as viewed in FIG. 2. This results in movement of the fulcrum 64 from its position aligned with the pin 44 to a position spaced to the left of the pin 44, which position is illustrated diagrammatically in FIG. 7. As there shown, when the lever 56 follows the cam major axis 52, the pin 44 is in the same position that it is in FIG. 6. However, when the lever 56 follows the cam minor axis 54, as shown in broken lines in FIG. 7, the pin 44 is moved in a direction such that it rotates the crank 40 about the pivot 42 in a direction to move the tool 36 toward the piston axis 22. Since the piston 22 is moved through one revolution for each revolution of the cam 50, the tool 36 will thus machine the piston 18 to an elliptical cross section having a major axis corresponding in diameter to the diameter of the circular cross section cut when the fulcrum 64 was in its FIG. 6 position, and a minor axis which is proportional to the proportion of the cam major axis to the minor axis 54. It can thus be seen that with the body 74 initially positioned so that the slide pin axis 66 is parallel to the lever surface 68, the piston 20 will be machined to a cross section varying along the axis 22 from circular to elliptical, with no axial taper on the major axis of the piston, but with a taper on the minor axis. The magnitude of this taper is determined by the shape of cam surface 100a.

Now assume that the set screws 88 are adjusted to position the body 74 so that the slide pin axis 66 is inclined with respect to the lever surface 68. Machining of the piston skirt 20 is commenced with the fulcrum 64 in its beginning position at the right-hand end of the surface 68 as viewed in FIG. 3 so that the fulcrum 64 and the pin 44 are aligned as illustrated in FIG. 6. As a result, as the piston 18 is rotated with a tool 36 in engagement therewith, the tool 36 will remain in a fixed position during rotation of the cam 50 so as to machine the skirt 20 to a circular cross section. As the housing 30 is moved upwardly, as viewed in FIG. 1, so as to move the cam follower 98 along the cam surface 100a and move the slide pin 62 to the left as viewed in FIG. 3, the fulcrum 64 will move along a line parallel to the slide pin axis 66 which is inclined with respect to the beginning position of the lever surface 68. The slide pin 62 is shown in a moved position in FIG. 3. Consequently, the further the slide pin 62 is moved to the left in FIG. 3, the further the pin 44 will be moved downwardly, as viewed in FIG. 3, by springs 70 and 72. This is illustrated in FIG. 8 in which the beginning position of the pin 44 is illustrated in solid lines.

In a position of the fulcrum 64 moved to the left as illustrated in FIG. 8, when the lever 56 is following the minor cam axis 54, the lever 56 will be in the broken line position illustrated at 56a, the pin 44 will be in the broken line position illustrated at 44a and the tool 36 will be in the broken line position illustrated at 36a. When the lever 56 is following the cam major axis 52, the lever 56 will be in the broken line position illustrated at 56b, the pin 44 will be in the broken line position illustrated at 44b, and the tool 36 will be in the broken line position illustrated at 36b. In this position, the tool 36 is moved inwardly relative to its beginning position, and the extent of movement of the fulcrum 64 to the left as viewed in FIG. 3 determines the extent of movement of the tool 36 inwardly along the major axes of the elliptical cross-sections being turned on the piston skirt 20. Thus, the major axes will be provided with a taper as illustrated in FIG. 9 and by properly shaping the cam surface 100a, this taper can be made to vary so as to form the barrel configuration indicated at 102 in FIG. 9. This taper of the piston skirt 20 along the major axes of the elliptical cross sections is desirable in many piston configurations.

As shown in FIG. 1, the cam 100 is mounted at one of its ends on a pivot 106 on main frame 12. Adjacent its opposite end, the cam 100 is pivotally connected to the piston rod in a fluid actuated cylinder assembly. Consequently, in any position of follower 98 on cam 100, actuation of cylinder assembly 108 is operable to move cam 100, follower 98 and thus arm 90. As a result, when the cylinder assembly 34 has moved the housing 30 so that the tool 36 has reached the upper limit of movement on skirt 20, cylinder assembly 108 can be actuated to either move tool 36 in on skirt 20, so as to remove more skirt material during downward movement of tool 36, or retract tool 36 to a position in a clearance relation with skirt 20. To retract tool 36, cam 100 is pivoted to the right as viewed in FIG. 1. This causes the arm 90 to move slide pin 62 to the right, as viewed in FIG. 2, relative to the beginning position of fulcrum 64. The fulcrum 64 then moves along inclined portion 104 of lever 56 to move pin 44 upwardly as viewed in FIGS. 2 and 3. This movement of pin 44 rotates crank 40 in a direction to move tool 36 away from piston axis 22. This retraction eliminates any machining operation during downward movement of housing 30, which is sometimes desirable, and also allows transfer of a machined piston 18 off head 16 and subsequent loading of another onto head 16 before the tool 36 is moved downwardly. To provide for turning of piston skirt 20 during downward movement of housing 30, the cam 100 is pivoted to the left as viewed in FIG. 1 prior to downward movement.

From the above description it is seen that this invention provides apparatus 10 capable of machining workpieces, such as the piston for internal combustion engines illustrated at 18, to a complex cross-sectional shape. By virtue of the arrangement of the slide pin 62 on the body 74 so that the axis 66 of the slide pin 62 can be adjusted relative to the lever surface 68, the apparatus 10 is readily adaptable to a variety of requirements for complex workpiece shapes. It is to be understood that in the drawings the inclination of the slide pin axis 66 in FIG. 3 is exaggerated relative to what is normally required since in precision parts such as pistons 18, minor variations in size, on the order of ten thousandths of an inch, are extremely significant. The illustration of the apparatus 10 in the drawings, therefore, have been exaggerated for illustrative purposes only in some instances.

It will be understood that the apparatus for machining articles such as pistons for internal combustion engines which is herein disclosed and described is presented for purposes of explanation and illustration and is not intended to indicate limits of the invention, the scope of which is defined by the following claims.

What is claimed is:

1. Apparatus for machining a workpiece having an axis to a shape in cross section which is selectively variable along said axis from circular to elliptical and which is tapered in the direction of said axis, said apparatus comprising means for rotating said workpiece about the axis thereof, a cutting tool, a housing supporting said cutting tool, means for moving said housing along a path substantially parallel to and adjacent said axis for engaging said tool with said workpiece, a bell crank member pivotally supported intermediate the ends thereof on said housing and having said tool supported on one end thereof, a rotatable cam in said housing, a lever having one end disposed for following said cam, pivot means connecting the opposite ends of said crank and said lever, means movably supported in said housing and engaged with a portion of said lever so as to form a fulcrum for said lever, said fulcrum means being mounted in said housing for movement along said lever portion in a predetermined line from a beginning position, said fulcrum means being adjustable in said housing so that said line is movable between a position parallel to and a position nonparallel to said lever portion, means maintaining said lever portion in engagement with said fulcrum means during following movement of said one end of said lever on said cam, and means responsive to movement of said housing along said path for moving said fulcrum means along said predetermined line.

2. Apparatus according to claim 1 in which said fulcrum means in said beginning position is aligned with said pivot means so that following movement of said lever on said cam is ineffective to move said pivot means and thus said tool.

3. Apparatus according to claim 1 in which said fulcrum means consists of a body adjustably mounted in said housing, a slide member having an axis and a projection extending transversely of said axis into engagement with said lever portion, said slide member being slidably mounted on said body for movement in a direction axially of said slide member, and means on said housing engaged with said body for moving said body to adjust the position of said slide member axis relative to said body.

4. Apparatus according to claim 3 in which said lever portion is straight and said means for moving said body is operable to move said slide member between positions in which the axis thereof is parallel to and inclined relative to said straight lever portion.

5. Apparatus according to claim 3 in which said adjustable mounting for said body comprises a dowel pin fixed on said housing and extending into said body so that said body is pivotally movable about said dowel pin, said dowel pin having an axis which is substantially perpendicular to said slide member axis, and in which said means for moving said body comprises set screw means on said housing engaged with opposite sides of said body and extending substantially perpendicular to said dowel pin axis.

6. Apparatus according to claim 1 further including a supporting frame on which said housing is mounted for movement along said path, and in which said means for moving said fulcrum means comprises cam means on said main frame and coacting cam follower means on said housing connected to said fulcrum means.

7. Apparatus according to claim 2 in which said cam is substantially elliptical in shape having a major axis and a minor axis and in which said means for moving said fulcrum means is operable to move said fulcrum means in a direction away from said cam so that when said lever follows the minor axis of said cam said pivot means is moved from the position thereof in said beginning position of said fulcrum means and said fulcrum means is concurrently moved in a direction away from said lever portion so that when said lever follows the major axis of said cam said pivot means is also moved relative to the position thereof in the beginning position of said fulcrum means.

8. Apparatus according to claim 3 in which said means for moving said fulcrum means along said predetermined line includes a lever pivotally mounted on said housing and engaged with said slide member.

9. Apparatus according to claim 6 in which said cam means is movably mounted on said main frame and means are provided for moving said cam means to adjust the position thereof on said main frame.

References Cited

UNITED STATES PATENTS

| | | | |
|---|---|---|---|
| 1,703,559 | 2/1929 | Teetor | 82—19 |
| 2,782,669 | 2/1957 | Brandenberger | 82—19 |

LEONIDAS VLACHOS, *Primary Examiner.*